(12) United States Patent  
Kitahara

(10) Patent No.: US 9,317,438 B2  
(45) Date of Patent: Apr. 19, 2016

(54) CACHE MEMORY APPARATUS, CACHE CONTROL METHOD, AND MICROPROCESSOR SYSTEM

(71) Applicant: Renesas Electronics Corporation, Kawasaki-shi, Kanagawa (JP)

(72) Inventor: Takashi Kitahara, Yokohama (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 670 days.

(21) Appl. No.: 13/668,009

(22) Filed: Nov. 2, 2012

(65) Prior Publication Data

US 2013/0111140 A1    May 2, 2013

(30) Foreign Application Priority Data

Nov. 2, 2011   (JP) ................................. 2011-240780

(51) Int. Cl.
*G06F 12/00* (2006.01)
*G06F 12/08* (2006.01)
*G06F 9/38* (2006.01)

(52) U.S. Cl.
CPC .......... *G06F 12/0888* (2013.01); *G06F 9/3804* (2013.01); *G06F 12/0875* (2013.01)

(58) Field of Classification Search
CPC .............. G06F 9/38; G06F 12/08; G06F 9/44
See application file for complete search history.

(56) References Cited

U.S. PATENT DOCUMENTS

| | | | |
|---|---|---|---|
| 5,473,764 A | 12/1995 | Chi | |
| 5,687,349 A | 11/1997 | McGarity | |
| 2004/0098540 A1* | 5/2004 | Itoh et al. | 711/118 |
| 2006/0095744 A1* | 5/2006 | Furuya | 712/238 |
| 2006/0190686 A1* | 8/2006 | Tsuboi | 711/125 |
| 2007/0088930 A1 | 4/2007 | Matsuda et al. | |
| 2008/0082806 A1* | 4/2008 | Yoshida | 712/237 |
| 2009/0182940 A1 | 7/2009 | Matsuda et al. | |

FOREIGN PATENT DOCUMENTS

| | | | |
|---|---|---|---|
| EP | 0457403 A2 | 11/1991 | |
| EP | 1785876 A1 | 5/2007 | |
| JP | 9-305490 A | 11/1997 | |

OTHER PUBLICATIONS

Extended European Search Report for Application No. 12190816.4-1953 dated Mar. 15, 2013.

* cited by examiner

*Primary Examiner* — Reginald Bragdon
*Assistant Examiner* — Mehdi Namazi
(74) *Attorney, Agent, or Firm* — McDermott Will & Emery LLP

(57) ABSTRACT

A cache memory apparatus according to the present invention includes a cache memory that caches an instruction code corresponding to a fetch address and a cache control circuit that controls the instruction code to be cached in the cache memory. The cache control circuit caches an instruction code corresponding to a subroutine when the fetch address indicates a branch into the subroutine and disables the instruction code to be cached when the number of the instruction codes to be cached exceeds a previously set maximum number.

13 Claims, 11 Drawing Sheets

US 9,317,438 B2

CACHE MEMORY APPARATUS, CACHE CONTROL METHOD, AND MICROPROCESSOR SYSTEM

CROSS-REFERENCE TO RELATED APPLICATIONS

This application is based upon and claims the benefit of priority from Japanese patent application No. 2011-240780, filed on Nov. 2, 2011, the disclosure of which is incorporated herein in its entirety by reference.

BACKGROUND

The present invention relates to a cache memory apparatus, a cache control method, and a microprocessor system, and especially to a cache memory apparatus, a cache control method, and a microprocessor system that are capable of efficiently caching an instruction code.

In recent years, incorporation of various functions and higher performance are demanded for electronic devices represented by AV equipments and home appliances. Therefore, higher performance is also demanded for a microprocessor system that controls these electronic devices. In general, the microprocessor system uses a prefetch buffer and a cache memory apparatus for preventing performance degradation at the time of fetching an instruction code from a low-speed memory.

The prefetch buffer can previously store instruction codes after an address of a currently executed instruction to a flip-flop and the like. This prevents the performance degradation that is caused by slow reading speed of the memory when reading the instruction code from the memory at the time of executing a normal instruction. The cache memory apparatus can previously store frequently used instruction codes to RAM (Random Access Memory). This prevents the performance degradation that is caused by slow reading speed of the memory at the time of reading the instruction code from the memory mainly upon a branch into a subroutine.

The larger the size of the prefetch buffer and the memory in the cache memory apparatus, the more instruction codes they can store in advance. Accordingly, the size of the memory must be larger in order to more reliably prevent the performance degradation that is caused by the slow reading speed of the memory. However, a larger size of the prefetch buffer and the memory in the cache memory apparatus increases the chip area, thereby increasing the manufacturing cost. Thus, trading-off between the performance and the cost must be taken into consideration to select a capacity with a minimum memory size that can produce a maximum advantage for these memory sizes.

Japanese Unexamined Patent Application Publication No. 9-305490 discloses a technique regarding a microprocessor system that can prevent a capacity conflict from being generated and the performance of the instruction cache from being negated. FIG. 9 is a block diagram for explaining the microprocessor system disclosed in Japanese Unexamined Patent Application Publication No. 9-305490. A microprocessor system shown in FIG. 9 includes a CPU 101, an instruction cache 102, an address bus 103, a data bus 104, and a counter 105.

The counter 105 receives a cache access notification signal S1 and a branch generation notification signal S2 that are output from the CPU 101 and outputs a cache function stop signal S3 to the instruction cache 102. The CPU 101 generates the cache access notification signal S1 for each access to the instruction cache 102. Therefore, a value of the counter 105 is decremented every time the CPU 101 accesses the instruction cache 102. Moreover, the CPU 101 generates the branch generation notification signal S2 for every subroutine call or every time when a branch into a minus direction is established. The counter 105 is initialized when the branch generation notification signal S2 is supplied, and the value of the counter 105 will be the number of entries. Further, when the value of the counter 105 is zero, the counter 105 outputs the cache function stop signal S3 to the instruction cache 102 to stop the function of the instruction cache 102.

Next, an operation of the microprocessor system shown in FIG. 9 is explained. FIG. 11 shows transitions of the instructions cached in the instruction cache 102 when a program shown in FIG. 10 is executed. In a loop of the program shown in FIG. 10, the CPU 101 sequentially fetches instructions A, B, C, and D from a main memory (not shown) and loads the instructions A, B, C, and D in the instruction cache 102 while executing the instructions A, B, C, and D (steps 201, 202, 203, and 204). In each of the steps 201, 202, 203, and 204, as the CPU 101 generates the cache access notification signal S1, the value of the counter 105 is decremented like 3, 2, 1, and 0. Consequently, all the entries of the instruction cache 102 are occupied, and after that, the entries in the instruction cache 102 will not be replaced by the generation of the cache function stop signal S3 in the counter 105.

Next, the CPU 101 sequentially fetches instructions E, F, G, and H from the main memory and executes the instructions E, F, G, and H (steps 205, 206, 207, and 208). In this case, since the entries in the cache 102 will not be replaced, the instructions A, B, C, and D remain in the instruction cache 102.

Next, after an instruction H, which is a branch instruction, is executed, the instruction A is executed again. In this case, the instruction A is already loaded into the instruction cache 102. Thus, there will be a so-called cache hit (step 209). Subsequently, also when the CPU 101 executes the instructions B, C, and D, as the instructions B, C, and D are loaded into the instruction cache 102, there will be a cache hit.

As described above, in the microprocessor system disclosed in Japanese Unexamined Patent Application Publication No. 9-305490, at the time of executing the program including the loop, it is possible to improve the performance of the instruction cache by disabling the cache function when the instruction cache is occupied.

SUMMARY

However, in the microprocessor system disclosed in Japanese Unexamined Patent Application Publication No. 9-305490, the instruction codes included in the subroutine are cached in the cache memory without considering the number of the instruction codes included in the subroutine. Therefore, the present inventor has found a problem that the instruction code cannot be efficiently cached.

An aspect of the present invention is a cache memory apparatus that includes a cache memory that caches an instruction code corresponding to a fetch address and a cache control circuit that controls the instruction code to be cached in the cache memory. The cache control circuit caches the instruction code corresponding to a subroutine when the fetch address indicates a branch into the subroutine and disables the instruction code to be cached when the number of the instruction codes to be cached exceeds a previously set maximum number.

The cache memory apparatus according to the present invention disables the cached instruction code when the number of the instruction codes cached in the cache memory exceeds the maximum number. Accordingly, as the instruction code in the subroutine with the relatively small number of the instruction codes can be preferentially cached in the cache memory, it is possible to efficiently cache the instruction code in the cache memory even in a cache memory with a relatively small capacity.

Another aspect of the present invention is a microprocessor system that includes a CPU, a memory that stores an instruction code to be executed in the CPU, a cache memory that caches the instruction code corresponding to a fetch address output from the CPU, and a cache control circuit that controls the instruction code to be cached in the cache memory. The cache control circuit caches the instruction code corresponding to a subroutine when the fetch address indicates a branch into the subroutine and disables the instruction code to be cached when the number of the instruction codes to be cached exceeds a previously set maximum number.

In the microprocessor system according to the present invention, when the number of the instruction codes cached in the cache memory exceeds the previously set maximum number, the cached instruction codes are disabled. Therefore, as the instruction code in the subroutine with the relatively small number of the instruction codes can be preferentially cached in the cache memory, it is possible to efficiently cache the instruction code in the cache memory even in a cache memory with a relatively small capacity.

Another aspect of the present invention is a cache control method for a cache memory that caches an instruction code corresponding to a fetch address. The cache control method includes caching the instruction code corresponding to a subroutine when the fetch address indicates a branch into the subroutine and disabling the instruction code to be cached when the number of the instruction codes to be cached exceeds a previously set maximum number.

In the cache control method according to the present invention, when the number of the instruction codes cached in the cache memory exceeds the previously set maximum number, the cached instruction codes are disabled. Therefore, as the instruction code in the subroutine with the relatively small number of the instruction codes can be preferentially cached in the cache memory, it is possible to efficiently cache the instruction code in the cache memory even in a cache memory with a relatively small capacity.

The present invention can provide a cache memory apparatus, a cache control method, and a microprocessor system that are capable of efficiently caching an instruction code.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

First Embodiment

Hereinafter, embodiments of the present invention are explained with reference to the drawings.

Figure 1:
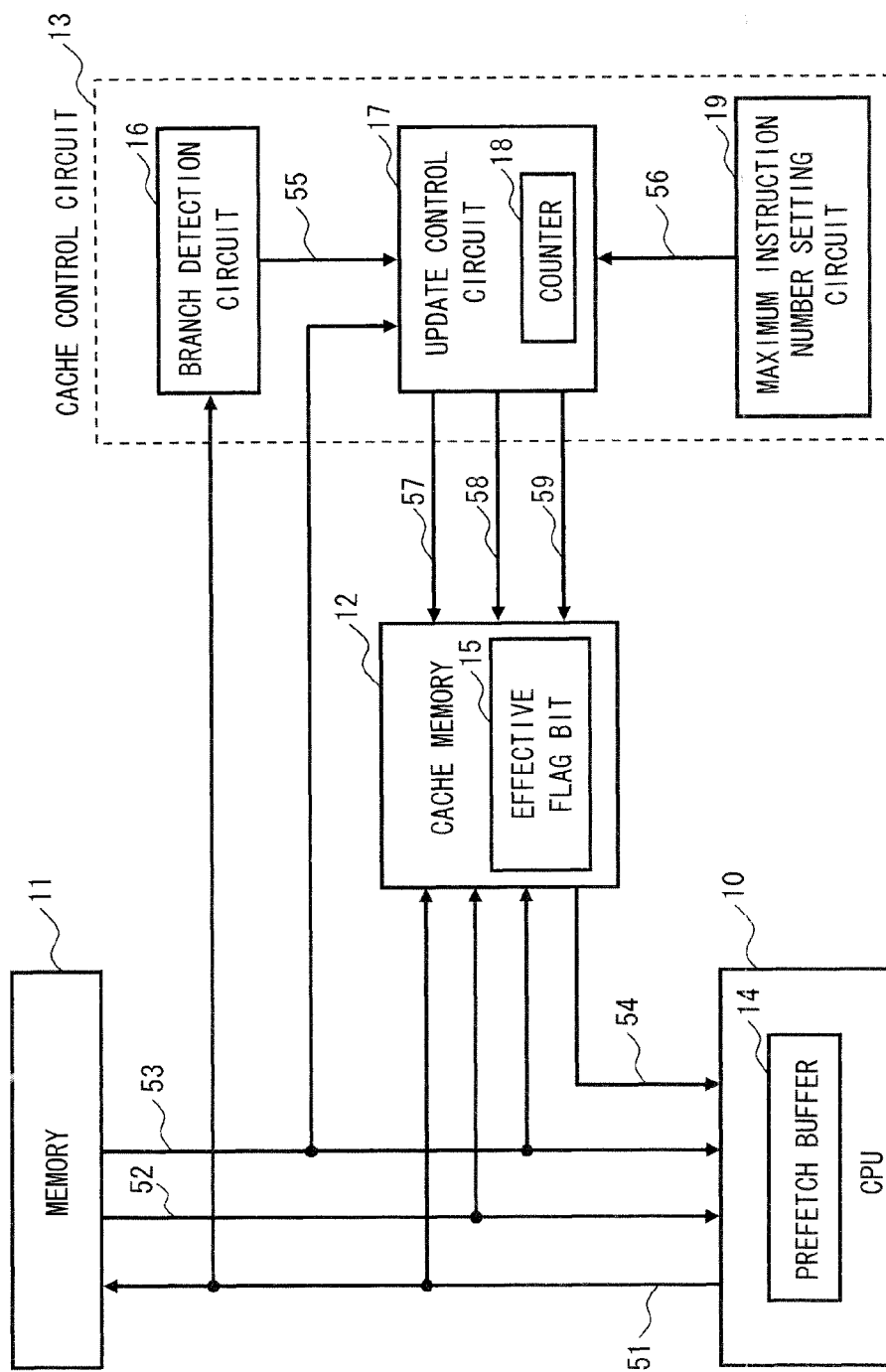
FIG. 1 is a block diagram showing a microprocessor system including a cache memory apparatus according to a first embodiment.

FIG. 1 is a block diagram showing a microprocessor system including a cache memory apparatus according to this embodiment. A microprocessor system 1 shown in FIG. 1 includes a CPU 10, a memory 11, a cache memory 12, and a cache control circuit 13. The cache control circuit 13 includes a branch detection circuit 16, an update control circuit 17, and a maximum instruction number setting circuit 19. The cache memory 12 and the cache control circuit 13 compose a cache memory apparatus.

A CPU 10 outputs a fetch address 51 to the memory 11, the cache memory 12, and the branch detection circuit 16. Moreover, the CPU 10 receives an instruction code 52 output from the memory 11 and an instruction code 54 output from the cache memory 12 and executes the received instruction codes 52 and 54. The instruction code 52 here is output from the memory 11 and is an instruction code output from the memory 11 to the CPU 10 when an instruction code corresponding to the fetch address 51 is not cached in the cache memory 12 (when there is no cache hit). Moreover, the instruction code 54 is output from the cache memory 12 and is an instruction code output from the cache memory 12 to the CPU 10 when an instruction code corresponding to the fetch address 51 is cached in the cache memory 12 (when there is a cache hit).

The CPU 10 includes a prefetch buffer 14. The prefetch buffer 14 can previously store instruction codes after an address of a currently executed instruction to a flip-flop and the like. After the instruction codes 52 and 54 supplied to the CPU 10 are temporarily stored to the prefetch buffer 14, the instruction codes 52 and 54 are executed by the CPU 10. Moreover, an instruction code storage enable signal 53 is supplied to the CPU 10 from the memory 11. The instruction code storage enable signal 53 indicates that the effective instruction code 52 is output from the memory 11. The prefetch buffer 14 stores the instruction code 52 at the timing when the instruction code storage enable signal 53 is output from the memory 11.

The memory 11 can be composed of DRAM (Dynamic Random Access Memory), which is a relatively low-speed memory, for example. The memory 11 stores the instruction code associated with the fetch address. The memory 11 outputs to the CPU 10 and the cache memory 12 the instruction code 52 associated with the fetch address 51 output from the CPU 10. The memory 11 further outputs to the CPU 10, the cache memory 12, and the update control circuit 17 the instruction code storage enable signal 53 indicating that the effective instruction code 52 is output from the memory 11.

The branch detection circuit 16 monitors the fetch address 51 output from the CPU 10, and when the fetch address 51 indicates a branch into subroutine, outputs the branch notification signal 55 to the update control circuit 17. Specifically, the branch detection circuit 16 evaluates that the fetch address 51 has branched into the subroutine when the fetch address 51 output from the CPU 10 changes from a continuous address to a discontinuous address.

The maximum instruction number setting circuit 19 sets a maximum number of the instruction codes to be stored to the cache memory 12. The maximum instruction number setting circuit 19 outputs a maximum instruction number signal 56 indicating the set maximum instruction number to the update control circuit 17. For example, the maximum instruction number setting circuit 19 can include a register (not shown) for storing information corresponding to the maximum instruction number. The user can access this register externally and set the maximum instruction number.

The update control circuit 17 instructs the cache memory 12 to start and stop caching. The update control circuit 17 receives the branch notification signal 55 output from the branch detection circuit 16 and the maximum instruction number signal 56 output from the maximum instruction number setting circuit 19 and outputs a cache start notification signal 57, a cache stop notification signal 58, and an effective flag bit reset signal 59 to the cache memory 12. The cache start notification signal 57 notifies a timing for the cache memory 12 to start caching the instruction code 52. Moreover, the cache stop notification signal 58 notifies an end of caching the instruction code 52 by the cache memory 12. The effective flag bit reset signal 59 resets an effective flag bit 15 of the cache memory 12.

Additionally, the update control circuit 17 includes a counter 18. The counter 18 is a circuit for counting the number of instructions in the subroutine. The counter 18 increments a counter value every time the instruction code storage enable signal 53 is output from the memory 11. Specifically, the instruction code storage enable signal 53 indicates that the effective instruction code 52 is output from the memory 11. The cache memory 12 stores the instruction code 52 to the cache memory 12 every time the instruction code storage enable signal 53 is output. The number of the instruction codes to be stored to the cache memory 12 can be counted by incrementing the counter value every time the instruction code storage enable signal 53 is supplied to the counter 18. Then, the update control circuit 17 compares the maximum instruction number indicated by the maximum instruction number signal 56 with the counter value, and when the counter value exceeds the maximum instruction number, outputs the effective flag bit reset signal 59 to the cache memory 12.

The cache memory 12 is composed of a memory that can operate faster than the memory 11. For example, SRAM (Static Random Access Memory) operating at a high speed can be used for the cache memory 12. The cache memory 12 receives the cache start notification signal 57, the cache stop notification signal 58, and the effective flag bit reset signal 59 that are output from the update control circuit 17, the fetch address 51 output from the CPU 10, and the instruction code 52 and the instruction code storage enable signal 53 that are output from the memory 11 and outputs the instruction code 54 to the CPU 10.

The cache memory 12 caches the instruction code corresponding to the fetch address 51 that is output from the CPU 10. Specifically, when the cache start notification signal 56 is supplied from the update control circuit 17, the cache memory 12 associates the instruction code 52 output from the memory 11 every time the instruction code storage enable signal 53 is supplied with the fetch address and caches the instruction code 52. Moreover, the cache memory 12 stops caching the instruction code 52 when the cache stop notification signal 57 is supplied from the update control circuit 17.

In addition, the cache memory 12 includes the effective flag bit (effective flag) 15 provided for each memory cell to which the instruction code is stored. The effective flag bit 15 is a flag indicating whether or not each cached instruction code is effective. When the instruction code is cached in the cache memory 12, the effective flag bit 15 is enabled (for example, a logical value of the effective flag bit 15 indicating effective is set to "1"). Then, when the number of the cached instruction codes (i.e., the value of the counter 18) exceeds the previously set maximum number (i.e., the maximum instruction number set by the maximum instruction number setting circuit 19), the effective flag bit 15 of the cached instruction code is disabled (for example, the logical value of the effective flag bit 15 indicating disabled is set to "0"). When the effective flag bit 15 is disabled, the update control circuit 17 outputs the effective flag bit reset signal 59 to the cache memory 12. On the other hand, when the number of the cached instruction codes is less than or equal to the previously set maximum number, the effective flag bit 15 of the cached instruction code remains effective ("1").

In other words, when the fetch address indicates a branch into the subroutine, the instruction code corresponding to the subroutine is to be cached in the cache memory 12, and when the number of the instruction codes to be cached exceeds the previously set maximum number, the instruction codes to be cached will be disabled.

Note that when the instruction code is newly cached in the cache memory 12, the instruction code can be cached in the memory cell where the effective flag bit 15 is disabled ("0"). Moreover, when the capacity of the cache memory 12 is filled up, the instruction code that has been left unused for the longest time may be overwritten with the instruction code to be newly cached. Alternatively, the instruction codes may be overwritten in the order from the least frequently used instruction code. Note that the instruction code not desired to be overwritten can be prohibited from being overwritten by fixing the effective flag bit 15 to effective ("1").

Figure 2:
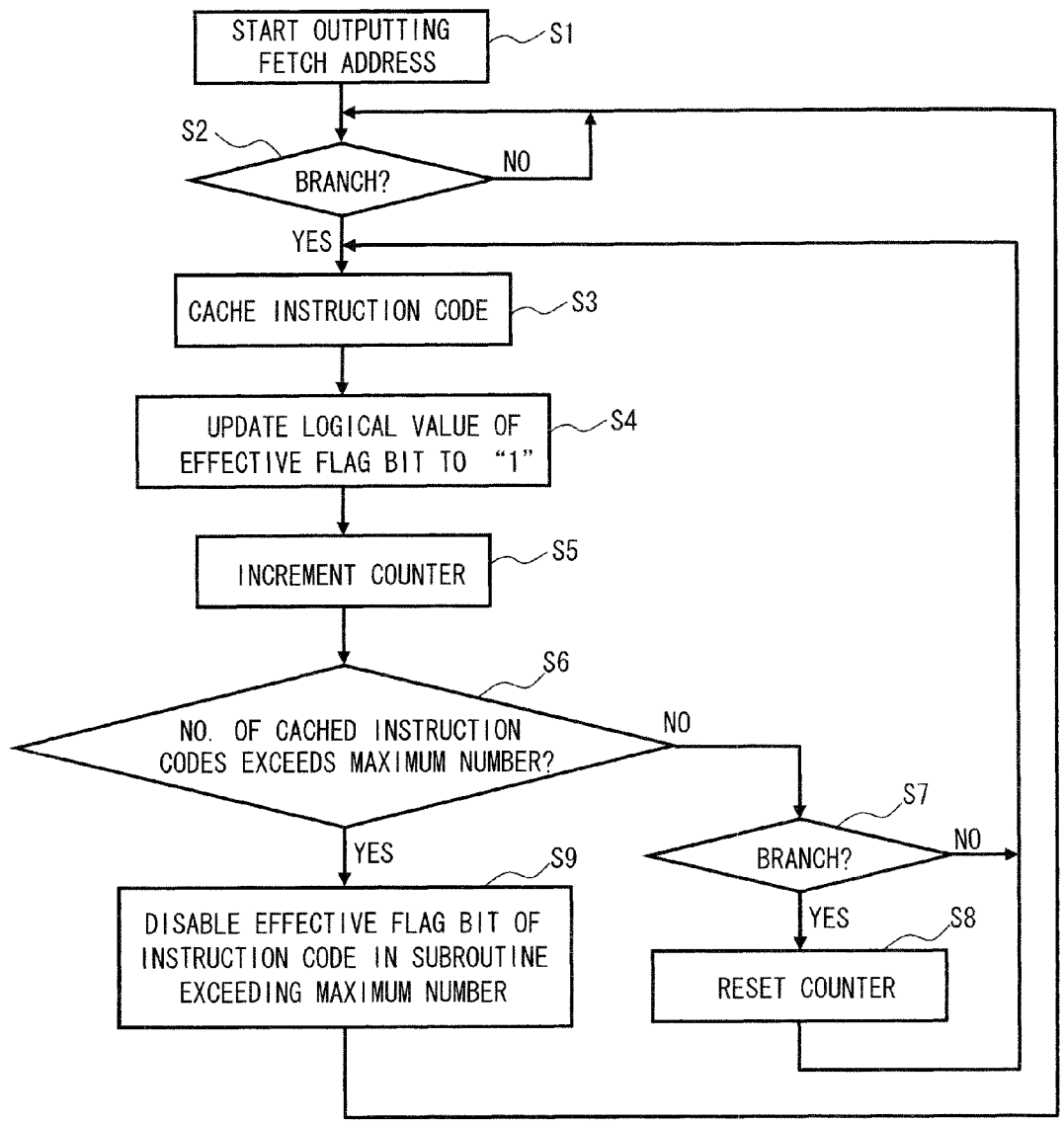
FIG. 2 is a flowchart for explaining an operation of the cache memory apparatus according to the first embodiment.
Figure 3:
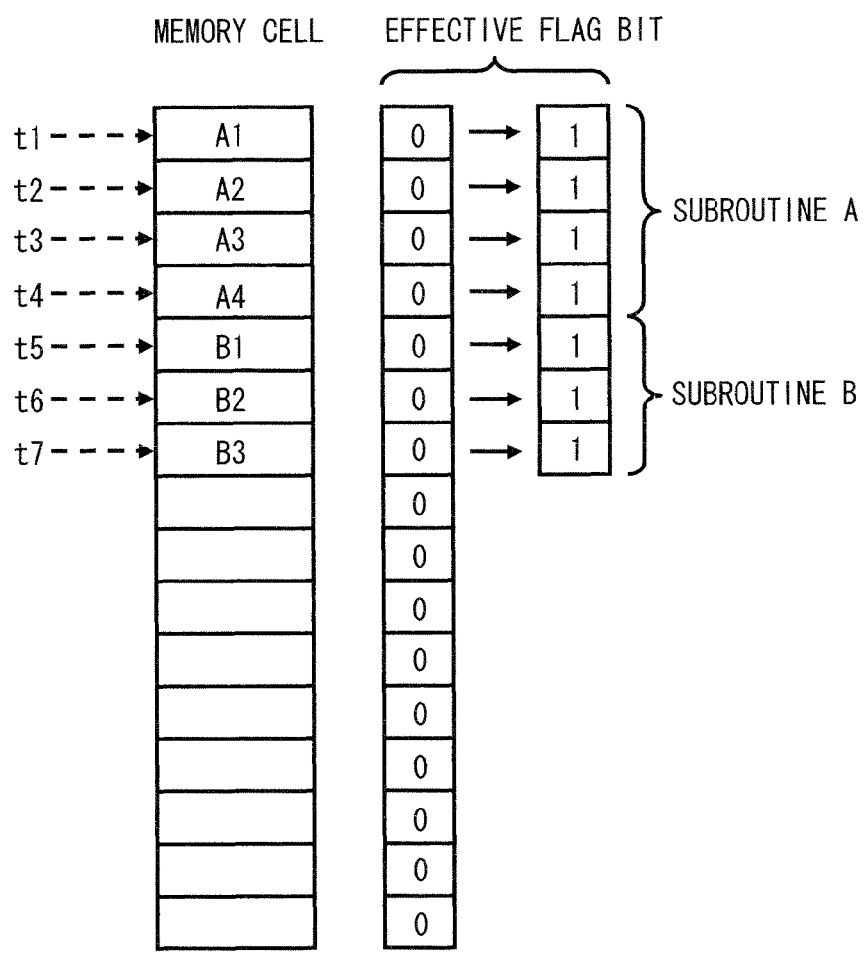
FIG. 3 explains an operation of the cache memory apparatus according to the first embodiment.
Figure 4:
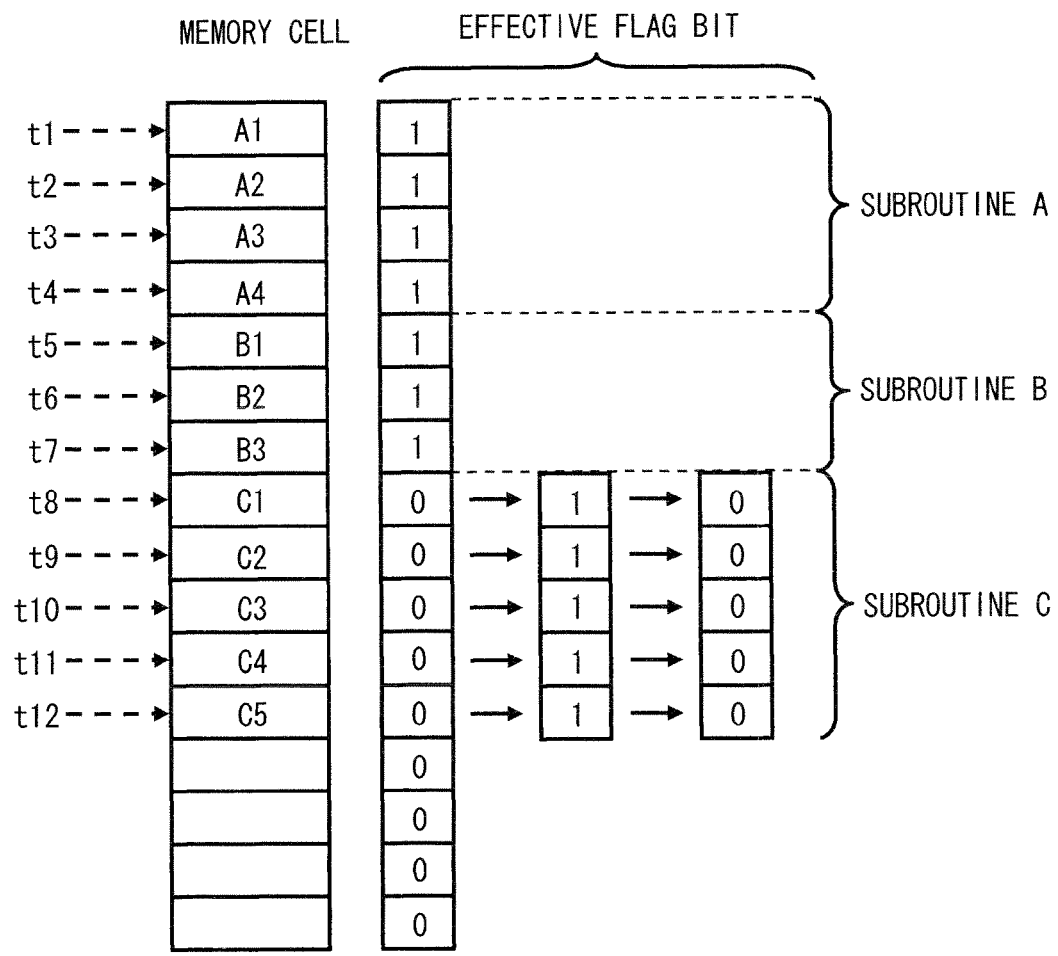
FIG. 4 explains an operation of the cache memory apparatus according to the first embodiment.

Next, an operation of the microprocessor system 1 including the cache memory apparatus according to this embodiment is explained. FIG. 2 is a flowchart for explaining the operation of the cache memory apparatus shown in FIG. 1. FIGS. 3 and 4 explain the operation of the cache memory apparatus shown in FIG. 1 and illustrate states of the memory cells and the effective flag bits of the cache memory 12 in which the instruction codes are cached. As shown in FIGS. 3 and 4, the effective flag bit is provided to correspond to each memory cell.

First, the CPU 10 starts outputting the fetch address 51 to the memory 11 in order to read the instruction code from the memory 11 (step S1). The branch detection circuit 16 monitors the fetch address 51 output from the CPU 10, and when the fetch address 51 indicates a branch into the subroutine (step S2: Yes), outputs the branch notification signal 55 to the update control circuit 17. Specifically, the branch detection circuit 16 evaluates that the program has branched into the subroutine when the fetch address 51 output from the CPU 10 changes from a continuous address to a discontinuous address. Note that when the fetch address 51 does not indicate the branch into the subroutine (step S2: No), the branch detection circuit 16 continues to monitor the fetch address 51 output from the CPU 10.

When the branch notification signal 55 is supplied from the branch detection circuit 16, the update control circuit 17 outputs the cache start notification signal 57 to the cache memory 12. Then, the cache memory 12 starts caching the instruction code 52.

On the other hand, when the fetch address 51 is supplied, the memory 11 outputs the instruction code 52 corresponding to this fetch address 51 to the prefetch buffer 14 in the CPU 10 and the cache memory 12. Moreover, the memory 11 outputs the instruction code storage enable signal 53 indicating that the effective instruction code 52 is output from the memory 11 to the prefetch buffer 14 in the CPU 10, the cache memory 12, and the update control circuit 17. Note that the operation example shown in FIG. 2 illustrates the case in which the instruction code corresponding to the fetch address 51 is not cached in the cache memory 12 (i.e., when there is no cache hit).

When the instruction code 52 and the instruction code storage enable signal 53 are supplied from the memory 11, the prefetch buffer 14 in the CPU 10 stores the instruction code 52 to the prefetch buffer 14.

Additionally, when the instruction code 52 and the instruction code storage enable signal 53 are supplied from the memory 11, the cache memory 12 caches the instruction code 52 to the memory cell of the cache memory 12 (step S3). At this time, the cache memory 12 updates the logical value of the effective flag bit 15 corresponding to the memory cell storing the instruction code 52 to "1" (step S4). That is, the instruction code 52 stored in the cache memory 12 is enabled.

For example, the effective flag bit 15 is set to "1" when the effective the instruction code is stored to the memory cell and set to "0" when the effective instruction code is not stored. Then, when the instruction code in the next subroutine is stored, the instruction code is stored to the memory cell where the effective flag bit 15 is "0".

Further, when the instruction code storage enable signal 53 is supplied from the memory 11, the counter 18 of the update control circuit 17 increments the counter value (step S5). Subsequently, the update control circuit 17 compares the maximum number of the instruction codes set by the maximum instruction number signal 56 with the value of the counter 18 (that corresponds to the number of the instruction codes stored to the cache memory 12) and evaluates whether or not the value of the counter 18 exceeds the maximum number of the instruction codes (step S6).

When the value of the counter 18 does not exceed the maximum number of the instruction codes (i.e., the value of the counter 18 is less than or equal to the maximum number of the instruction codes, step S6: No), the effective flag bit of the cached instruction code remains effective ("1"). Next, the branch detection circuit 16 monitors the next fetch address 51 output from the CPU 10, and when the fetch address 51 does not indicate the branch into a new subroutine (step S7: No), the operation after the step S2 is repeated. On the other hand, when the next fetch address 51 output from the CPU 10 indicates the branch into a new subroutine (step S7: Yes), the value of the counter 18 is reset (step S8), and the operation after the step S2 is repeated.

Alternatively, when the value of the counter 18 exceeds the maximum number of the instruction codes (step S6: Yes), the effective flag bits of all the instruction codes in the subroutine including the last cached instruction code are disabled ("0") (step S9). Specifically, when the value of the counter 18 exceeds the maximum number of the instruction codes that is set by the maximum instruction number signal 56 (step S6: Yes), the update control circuit 17 outputs the effective flag bit reset signal 59 to the cache memory 12 and disables ("0") the effective flag bits of all the instruction codes in the subroutine including the last cached instruction code. In addition, the update control circuit 17 outputs the cache stop notification signal 58 to the cache memory 12 for the cache memory 12 to stop caching the instruction code 52. Then, the operation after the step S1 is repeated.

The operation of the above steps S1 to S8 is explained in more detail using FIG. 3. In the example shown in FIG. 3, the maximum number of the instruction codes set by the maximum instruction number setting circuit 19 is four. Further, each of the timings t1 to t7 in FIG. 3 corresponds to the timing when the fetch address 51 is output from the CPU 10 and the instruction code 52 corresponding to the fetch address 51 is cached in the cache memory 12. That is, the process including the steps S3 to S6 is executed once for each timing t1 to t7 in FIG. 3.

The example shown in FIG. 3 illustrates the case in which instruction codes A1 to A4 corresponding to a subroutine A and instruction codes B1 to B3 corresponding to a subroutine B are stored to the memory cells of the cache memory 12. Note that the fetch addresses corresponding to the instruction codes A1 to A4 shall be add_A1 to add_A4, and the fetch addresses corresponding to the instruction codes B1 to B3 shall be add_B1 to add_B3.

First, the operation at the timing t1 is explained. When the fetch address add_A1 corresponding to the subroutine A is output from the CPU 10, the branch detection circuit 16 detects the branch and outputs the branch notification signal 55 to the update control circuit 17 (step S2: Yes). After that, when the cache start notification signal 57 is supplied from the update control circuit 17 and the instruction code storage enable signal 53 is supplied from the memory 11, the cache memory 12 stores the instruction code A1 corresponding to the fetch address add_A1 to the memory cell (step S3). At this time, the instruction code A1 is stored to the memory cell where the logical value of the effective flag bit is "0". When the instruction code A1 is stored to the memory cell, the logical value of the effective flag bit 15 at the corresponding address is updated to "1" (step S4). After that, the process moves to the steps S5, S6, and then S7.

As the fetch address add_A2 at the timing t2 is a fetch address in the subroutine A, the branch detection circuit 16 evaluates that there is no branch in the step S7 (step S7: No). Next, when the instruction code storage enable signal 53 is supplied from the memory 11, the cache memory 12 stores the instruction code A2 corresponding to the fetch address add_A2 to the memory cell (step S3). When the instruction code A2 is stored to the memory cell, the logical value of the effective flag bit 15 at the corresponding address is updated to "1" (step S4). After that, the process moves to the steps S5, S6, and then S7.

The similar operation is performed at the timings t3 and t4. Note that as the value of the counter 18 is four at the timing t4 and does not exceed the maximum number of the instruction codes, which is four, that is set by the maximum instruction number setting circuit 19 (step S6: No), the process moves to the step S7.

Then, when the fetch address add_B1 of the new subroutine B is output from the CPU 10 at the timing t5, the branch detection circuit 16 detects the branch and outputs the branch notification signal 55 to the update control circuit 17 (step S7: Yes). The update control circuit 17 resets the value of the counter 18 as the branch detection circuit 16 detected the branch (step S8). When the instruction code storage enable signal 53 is supplied from the memory 11, the cache memory 12 stores the instruction code B1 corresponding to the fetch address add_B1 to the memory cell (step S3). When the instruction code B1 is stored to the memory cell, the logical value of the effective flag bit 15 at the corresponding address is updated to "1" (step S4). After that, the process moves to the steps S5, S6, and then S7.

The similar operation is performed at the timings t6 and t7. Note that as the value of the counter 18 is three at the timing t7 and does not exceed the maximum number of the instruction codes, which is four, that is set by the maximum instruction number setting circuit 19, the process moves to the step S7.

Next, the operation of the above steps S1 to S7 and S9 (i.e., the operation including the step S9 (resetting the effective flag bit)) is explained in more detail using FIG. 4. In the example shown in FIG. 4, the maximum number of the instruction codes set by the maximum instruction number setting circuit 19 is four. Further, each of the timings t1 to t12 in FIG. 4 corresponds to the timing when the fetch address 51 is output from the CPU 10 and the instruction code 52 corresponding to the fetch address 51 is cached in the cache memory 12. That is, the process including the steps S3 to S6 is executed once at each timing t1 to t12 in FIG. 4.

The example shown in FIG. 4 illustrates the case in which when the instruction codes A1 to A4 corresponding to the subroutine A and the instruction codes B1 to B3 corresponding to the subroutine B are stored to the memory cells of the cache memory 12, and after instruction codes C1 to C5 corresponding to a subroutine C are stored to the memory cells of the cache memory 12 once, the instruction codes C1 to C5 are disabled. Note that the operation at the timings t1 to t7 in FIG. 4 is similar to the operation shown in FIG. 3, thus the explanation will not be repeated.

When a fetch address add_C1 of the subroutine C is newly output from the CPU 10 at the timing t8, the branch detection circuit 16 detects the branch and outputs the branch notification signal 55 to the update control circuit 17 (step S7: Yes). As the branch detection circuit 16 detected the branch, the update control circuit 17 resets the value of the counter 18 (step S8). When the instruction code storage enable signal 53 is supplied from the memory 11, the cache memory 12 stores the instruction code C1 corresponding to the fetch address add_C1 to the memory cell (step S3). When the instruction code C1 is stored to the memory cell, the logical value of the effective flag bit 15 at the corresponding address is updated to "1" (step S4). After that, the process moves to the steps S5, S6, and then S7. The similar operation is performed at the timings t9 to t11.

As the fetch address add_C5 at the timing t12 is a fetch address in the subroutine C, the branch detection circuit 16 evaluates that there is no branch in the step S7 (step S7: No). Next, when the instruction code storage enable signal 53 is supplied from the memory 11, the cache memory 12 stores the instruction code C5 corresponding to the fetch address add_C5 to the memory cell (step S3). When the instruction code C5 is stored to the memory cell, the logical value of the effective flag bit 15 at the corresponding address is updated to "1" (step S4).

Moreover, the counter 18 in the update control circuit 17 is incremented (step S5), and the value of the counter will be five. The update control circuit 17 compares four, which is the maximum number of the instruction codes set by the maximum instruction number signal 56, with five, which is the value of the counter 18. In this case, since the value of the counter 18 exceeds the maximum number of the instruction codes (step S6: Yes), the effective flag bits of all the instruction codes C1 to C5 in the subroutine C are reset, that is, disabled ("0") (step S9). Specifically, as shown in FIG. 4, the values of the effective flag bits corresponding to the memory cells to which the instruction codes C1 to C5 are stored are updated to "0" from "1". This disables the instruction codes C1 to C5 stored to the memory cells, and when a new instruction code is stored, the new instruction code is overwritten in the memory cells to which the instruction codes C1 to C5 are stored.

As explained in Background, a prefetch buffer and a cache memory apparatus are used in the microprocessor system in order to prevent performance degradation at the time of fetching an instruction from a low-speed memory. The prefetch buffer can previously store instruction codes after an address of a currently executed instruction to a flip-flop and the like. This prevents the performance degradation that is caused by slow reading speed of the memory when reading the instruction code from the memory at the time of executing a normal instruction. Moreover, the cache memory apparatus can previously store frequently used instruction codes to RAM in advance. This prevents the performance degradation that is caused by slow reading speed of the memory at the time of reading the instruction code from the memory mainly upon a branch into a subroutine.

For example, a memory capable of fetching once in two clocks (fetch latency=2) is connected to a CPU with a bus width of 64 bits. When the CPU can execute 32-bit instruction at each clock, at the same time when the CPU executes the instruction for two clocks (which are 64 bits), the instruction of the next address (which is 64-bit instruction) is stored to the prefetch buffer, thus the slow fetch latency can be concealed.

However, when the program branches, a penalty of performance degradation is incurred from using the prefetch buffer. This is because that as the previously read instruction code stored to the prefetch buffer will not be used because of the generation of the branch, it is necessary to abandon these instruction codes and fetch the instruction code again. At this time, the degree of the penalty incurred by the branch differs depending on the number of the instruction codes in the branched subroutine.

When a subroutine with a large number of the instruction codes (for example, the number of the instruction codes is 100), the penalty of the branch is incurred first. However as the instruction codes are stored to the prefetch buffer, the low fetch latency can be concealed. Therefore, the penalty is definitely incurred for example once in 100 clocks.

On the other hand, when the subroutine with a small number of the instruction codes (for example, three instructions) is executed, the penalty by the branch is incurred first, and then the instruction codes are stored to the prefetch buffer. However, in this case, as the program branches into the next subroutine before an advantage of using the prefetch buffer appears, the penalty is incurred at the rate of once in three clocks, for example, which is a considerably high rate.

Specifically, in the microprocessor system, storing the instruction code in the subroutine with the relatively small number of the instruction codes and not the subroutine with a relatively large number of the instruction codes to the cache memory apparatus reduces the probability of incurring the penalty, thereby improving the performance of the microprocessor system at a lower cost.

However, in the microprocessor system disclosed in Japanese Unexamined Patent Application Publication No. 9-305490, the instructions included in the subroutine are cached in the cache memory without considering the number of the instructions included in the subroutine. Therefore, there has been a problem that the instruction codes cannot be efficiently cached.

On the other hand, in the cache memory apparatus according to this embodiment, when the number of the instruction codes cached in the cache memory 12 exceeds the previously set maximum number, the cached instruction codes are disabled. In other words, in the cache memory apparatus according to this embodiment, the instruction code in the subroutine exceeding the previously set maximum number will not be cached in the cache memory 12. Accordingly, the instruction code in the subroutine with the relatively small number of the instruction codes can be preferentially cached in the cache memory 12, thus the instruction code can be efficiently cached in the cache memory with a relatively small capacity.

Usually, there is a subroutine that executes various tasks in the program for controlling the microprocessor system. For example, in the embedded microprocessor system, there are many short subroutines such as a subroutine that loops at the same address in order to wait for an interrupt signal from a peripheral equipment and a subroutine that sets a predetermined value to a counter and loops while decrementing the value and exits from the loop when the counter value reaches zero. The cache memory apparatus according to this embodiment can produce an advantage especially when incorporated in such a microprocessor system that executes a program including a number of short subroutines.

Further, the maximum number of the instruction codes set by the maximum instruction number setting circuit 19 can be arbitrarily set. However in order to improve the performance of the cache memory apparatus with a small memory capacity, the number of the instruction codes that can be executed by the CPU 10 may be held in the cache memory 12 while waiting for the clocks of the fetch latency in the memory 11. The fetch latency in the memory 11 here is the number of clocks since the CPU 10 outputs the fetch address 51 until the memory 11 outputs the instruction code 52. Specifically, the maximum number of the instruction codes obtained by (the fetch latency in the memory 11)/(the number of clocks necessary to execute one instruction code) will be the most efficient setting value to improve the performance of the microprocessor system with a small memory capacity.

As explained above, this embodiment according to the present invention can provide a cache memory apparatus, a cache control method, and a microprocessor system that are capable of efficiently caching the instruction code.

Second Embodiment

Figure 5:
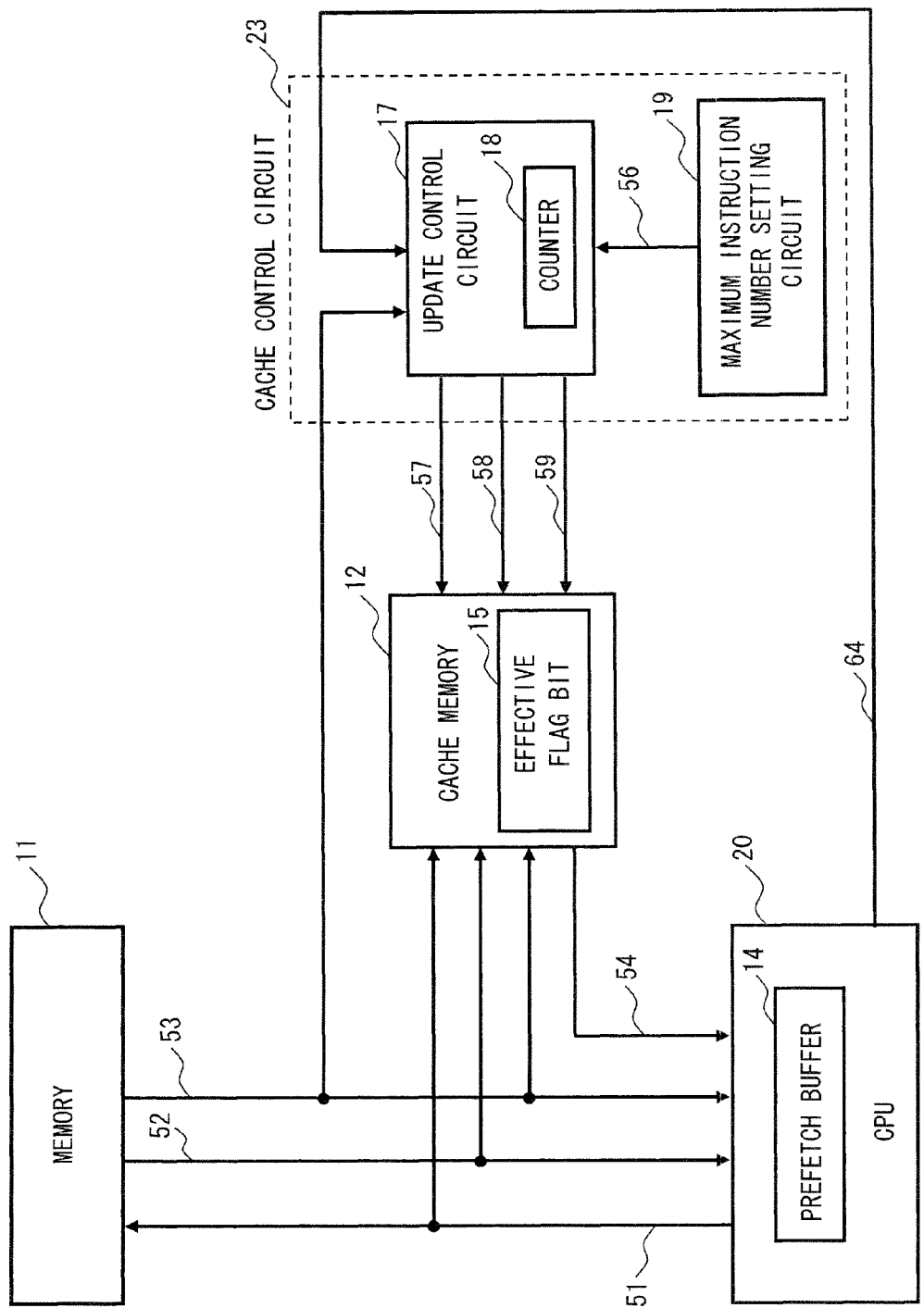
FIG. 5 is a block diagram showing a microprocessor system including a cache memory apparatus according to a second embodiment.

Next, a second embodiment of the present invention is explained. FIG. 5 is a block diagram showing a microprocessor system 2 including a cache memory apparatus according to this embodiment. The microprocessor system 2 shown in FIG. 5 includes a CPU 20, the memory 11, the cache memory 12, and a cache control circuit 23. The cache control circuit 23 includes the update control circuit 17 and the maximum instruction number setting circuit 19. The cache memory 12 and the cache control circuit 23 compose the cache memory apparatus.

The microprocessor system 2 including the cache memory apparatus according to this embodiment is different from the microprocessor system 1 according to the first embodiment in the point that the branch detection circuit 16 shown in FIG. 1 is not included. As other configurations are same as the microprocessor system 1 according to the first embodiment, the same components are denoted by the same reference numerals, and the explanation will not be repeated.

As shown in FIG. 5, the CPU 20 outputs the fetch address 51 to the memory 11 and the cache memory 12. Moreover, the CPU 20 receives the instruction code 52 output from the memory 11 and the instruction code 54 output from the cache memory 12 and executes the received instruction codes 52 and 54.

Additionally, the CPU 20 outputs a branch notification signal 64 to the update control circuit 17. The branch notification signal 64 here notifies the update control circuit 17 of the branch into the subroutine when the fetch address 51 output from the CPU 20 indicates the branch into the subroutine. Since the CPU 20 branches by its own instruction process, the CPU 20 can output the branch notification signal 64 to the update control circuit 17. The branch notification signal 64 supplied to the update control circuit 17 corresponds to the branch notification signal 55 supplied to the update control circuit 17 in the microprocessor system 1 according to the first embodiment.

As described above, in the microprocessor system 2 according to this embodiment, the CPU 20 detects the branch at the steps S2 and S7 shown in FIG. 2. As other configurations are same as the microprocessor system 1 according to the first embodiment, the explanation will not be repeated here.

In the microprocessor system 2 according to this embodiment, the branch detection circuit 16 used in the microprocessor system 1 of the first embodiment can be eliminated, thereby simplifying the cache control circuit.

Third Embodiment

Figure 6:
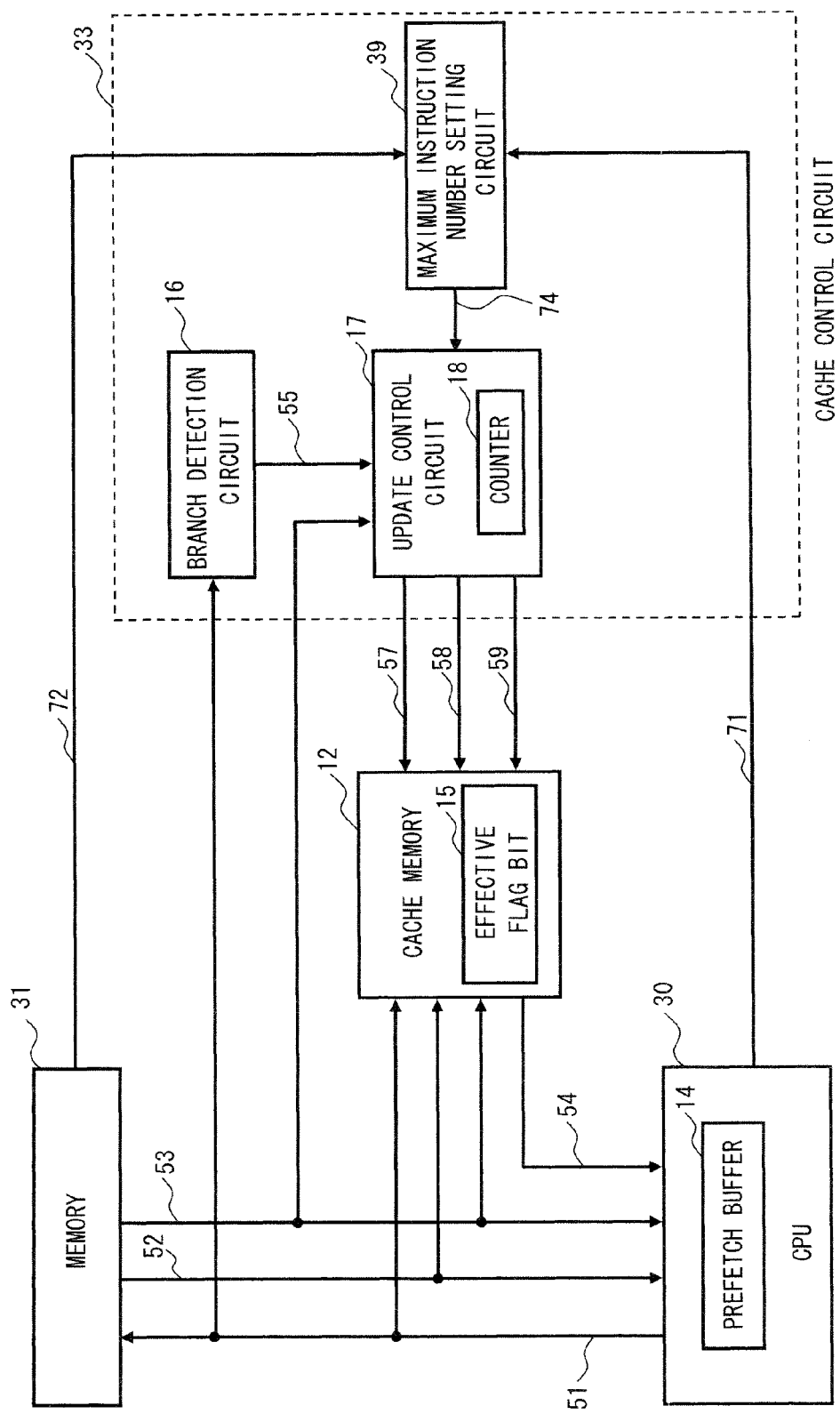
FIG. 6 is a block diagram showing a microprocessor system including a cache memory apparatus according to a third embodiment.

Next, a third embodiment of the present invention is explained. FIG. 6 is a block diagram showing a microprocessor system 3 including a cache memory apparatus according to this embodiment. The microprocessor system 3 shown in FIG. 6 includes a CPU 30, a memory 31, the cache memory 12, and a cache control circuit 33. The cache control circuit 33 includes the branch detection circuit 16, the update control circuit 17, and a maximum instruction number setting circuit 39. The cache memory 12 and the cache control circuit 33 compose the cache memory apparatus.

The microprocessor system 3 including the cache memory apparatus according to this embodiment is different from the microprocessor system 1 according to the first embodiment shown in FIG. 1 in the point that the maximum instruction number setting circuit 39 determines the maximum instruction number using clock number information 71 output from the CPU 30 and latency information 72 output from the memory 31. As other configurations are same as the microprocessor system 1 according to the first embodiment, the same components are denoted by the same reference numerals, and the explanation will not be repeated here.

The CPU 30 outputs the clock number information 71 to the maximum instruction number setting circuit 39. The clock number information 71 is information regarding the number of clocks necessary for the CPU 30 to execute one instruction code. This clock number information 71 may be stored to a register (not shown) included in the CPU 30 in advance. As the configuration and operation of the CPU 30 except for this point are same as those of the CPU 10 in the microprocessor 1 according to the first embodiment, the explanation will not be repeated.

The memory 31 outputs the latency information 72 to the maximum instruction number setting circuit 39. The latency information 72 is information regarding the fetch latency in the memory 11. The fetch latency in the memory 31 corresponds to the number of clocks since the CPU 30 outputs the fetch address 51 until the memory 30 outputs the instruction code 52. The latency information 72 may be stored to a register (not shown) included in the memory 31 in advance. As the configuration and operation of the memory 31 except for this point are same as those of the memory 11 in the microprocessor 1 according to the first embodiment, the explanation will not be repeated.

The maximum instruction number setting circuit 39 sets the maximum number of the instruction codes to be stored to the cache memory 12 using the clock number information 71 output from the CPU 30 and the latency information 72 output from the memory 31. Although the maximum number of the instruction codes set by the maximum instruction number setting circuit 39 can be arbitrarily set, in order to improve the performance of the cache memory apparatus with a small memory capacity, the number of the instruction codes executed by the CPU 30 may be held in the cache memory 12 while waiting for the cocks of the fetch latency in the memory 31. Specifically, the maximum number of the instruction codes obtained by (the fetch latency in the memory 31)/(the number of clocks necessary to execute one instruction code) will be the most efficient setting value to improve the performance of the cache memory apparatus with a small memory capacity.

The maximum instruction number setting circuit 39 outputs a maximum instruction number signal 74 indicating the set maximum number of the instruction codes to the update control circuit 17. The maximum instruction number signal 74 supplied to the update control circuit 17 corresponds to the maximum instruction number signal 56 supplied to the update control circuit 17 in the microprocessor system 1 according to the first embodiment.

In the microprocessor system 2 according to this embodiment, the maximum instruction number setting circuit 39 can set the maximum number of the instruction codes to be stored to the cache memory 12 using the clock number information 71 output from the CPU 30 and the latency information 72 output from the memory 31. Therefore, the maximum number of the instruction codes can be automatically set according to the CPU 30 and the memory 31 to be used without involving a user to set the maximum number of the instruction codes.

Fourth Embodiment

Figure 7:
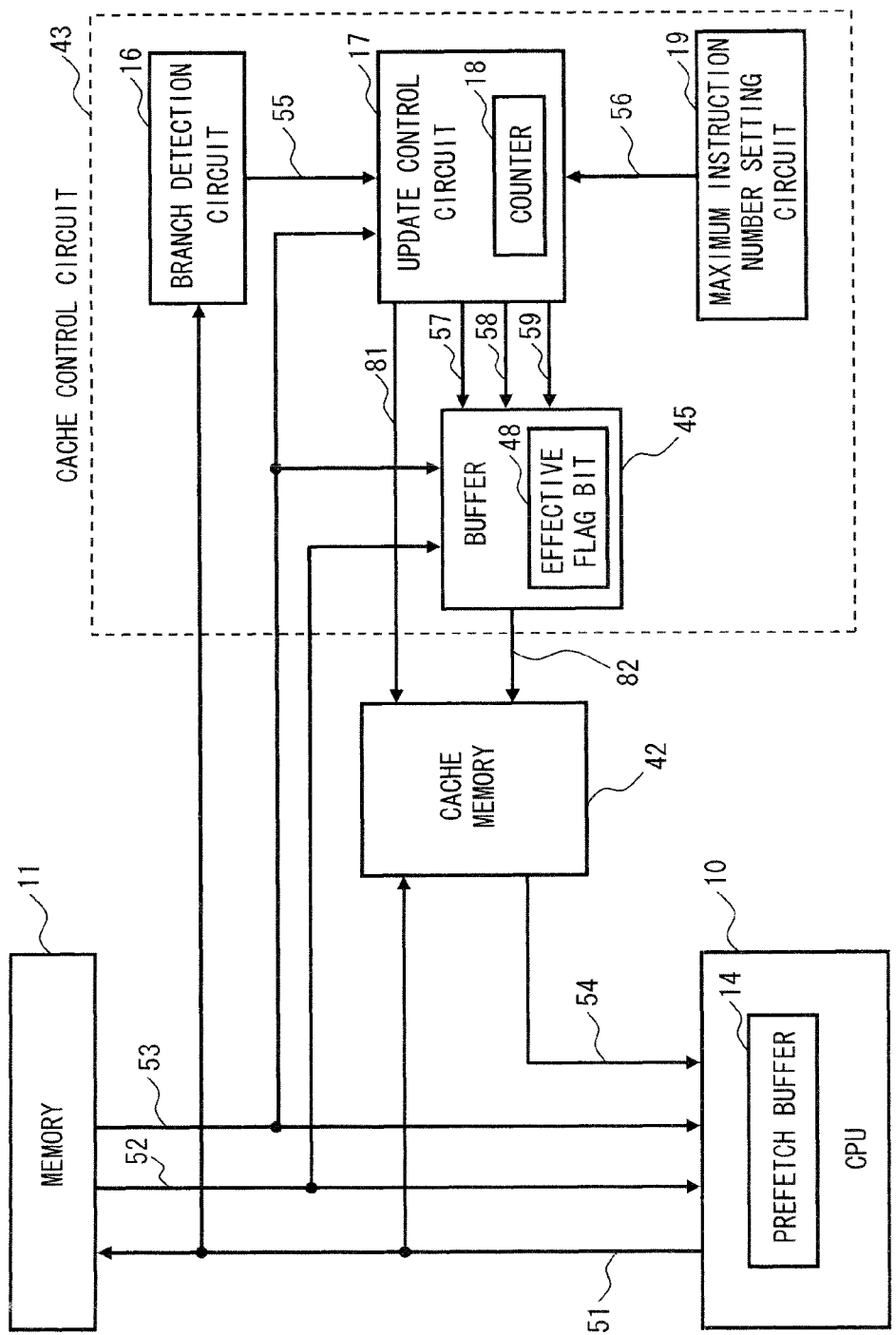
FIG. 7 is a block diagram showing a microprocessor system including a cache memory apparatus according to a fourth embodiment.

Next, a fourth embodiment of the present invention is explained. FIG. 7 is a block diagram showing a microprocessor system 4 including a cache memory apparatus according to this embodiment. The microprocessor system 4 shown in FIG. 7 includes the CPU 10, the memory 11, a cache memory 42, and a cache control circuit 43. The cache control circuit 43 includes the branch detection circuit 16, the update control circuit 17, the maximum instruction number setting circuit 19, and a buffer 45. The cache memory 42 and the cache control circuit 43 compose the cache memory apparatus.

The microprocessor system 4 including the cache memory apparatus according to this embodiment is different from the microprocessor 1 according to the first embodiment shown in FIG. 1 in the point that the buffer 45 is included in the cache control circuit 43, and the instruction code 52 output from the memory 11 is temporarily stored to this buffer 45 and is transferred to the cache memory 42. As other configurations are same as the microprocessor system 1 according to the first embodiment, the same components are denoted by the same reference numerals and the explanation will not be repeated.

The cache memory 42 receives the fetch address 51 output from the CPU 10, a transfer enable signal 81 output from the update control circuit 17, and a cache target instruction code 82 output from the buffer 45 and outputs the instruction code 54 to the CPU 10. The instruction code (the cache target instruction code 82) temporarily stored to the buffer 45 is transferred to the cache memory 42.

The buffer 45 temporarily stores the instruction code 52 output from the memory 11 and then transfers the instruction code 52 to the cache memory 42. The buffer 45 receives the instruction code 52 and the instruction code storage enable signal 53 that are output from the memory 11, the cache start notification signal 57, the cache stop notification signal 58, and the effective flag bit reset signal 59 that are output from the update control circuit 17 and outputs the cache target instruction code 82 to the cache memory 42. Moreover, the buffer 45 includes an effective flag bit 48 provided for each memory cell to which the instruction code is stored.

Further, when the number of the instruction codes stored to the buffer 45 (i.e., the value of the counter 18) exceeds the previously set maximum number (i.e., the maximum instruction number set by the maximum instruction number setting circuit 19), the effective flag bit 48 of the instruction code stored to the buffer is disabled (for example, the logical value of the effective flag bit indicating disabled is set to "0"). When the effective flag bit 48 is disabled, the update control circuit 17 outputs the effective flag bit reset signal 59 to the buffer 45. Meanwhile, when the number of the instruction codes stored to the buffer is less than or equal to the previously set maximum number, the effective flag bit 48 stored to the buffer remains effective ("1"). Then, when the branch detection circuit 16 detects the branch into the subroutine in the state where the number of the instruction codes stored to the buffer is less than or equal to the previously set maximum number, the buffer 45 transfers the temporarily stored instruction code (the cache target instruction code 82) to the cache memory 42. At this time, the transfer enable signal 81 is activated.

Figure 8:
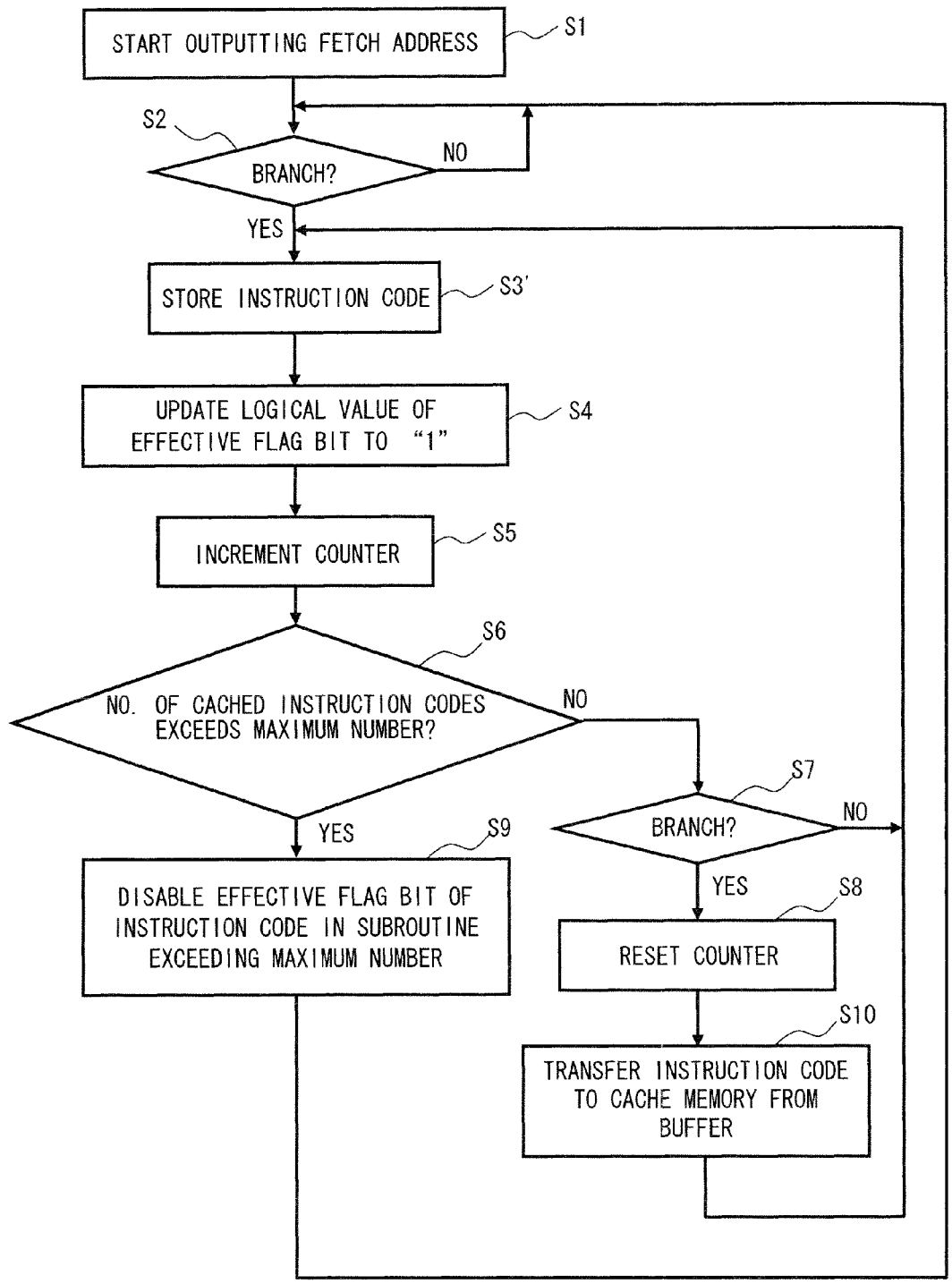
FIG. 8 is a flowchart for explaining an operation of the cache memory apparatus according to the fourth embodiment.
Figure 9:
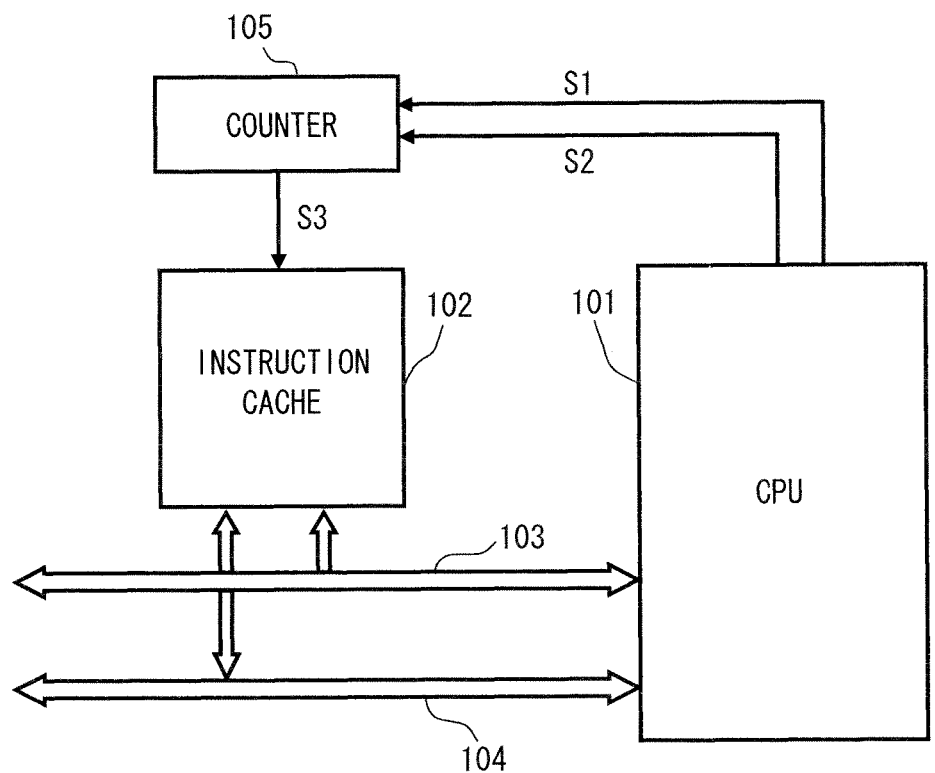
FIG. 9 explains a technique disclosed in Japanese Unexamined Patent Application Publication No. 9-305490.
Figure 10:
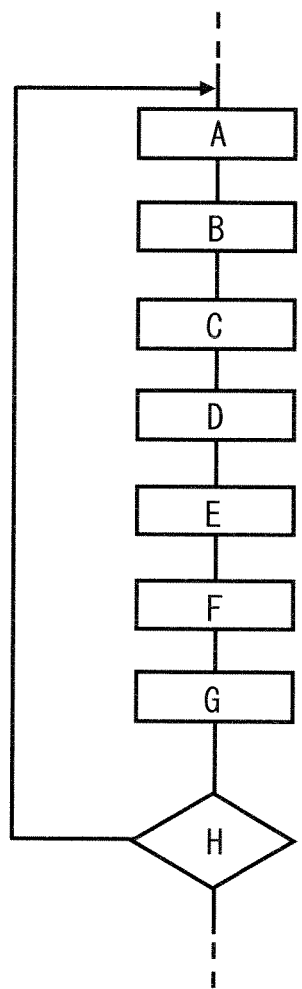
FIG. 10 explains the technique disclosed in Japanese Unexamined Patent Application Publication No. 9-305490.
Figure 11:
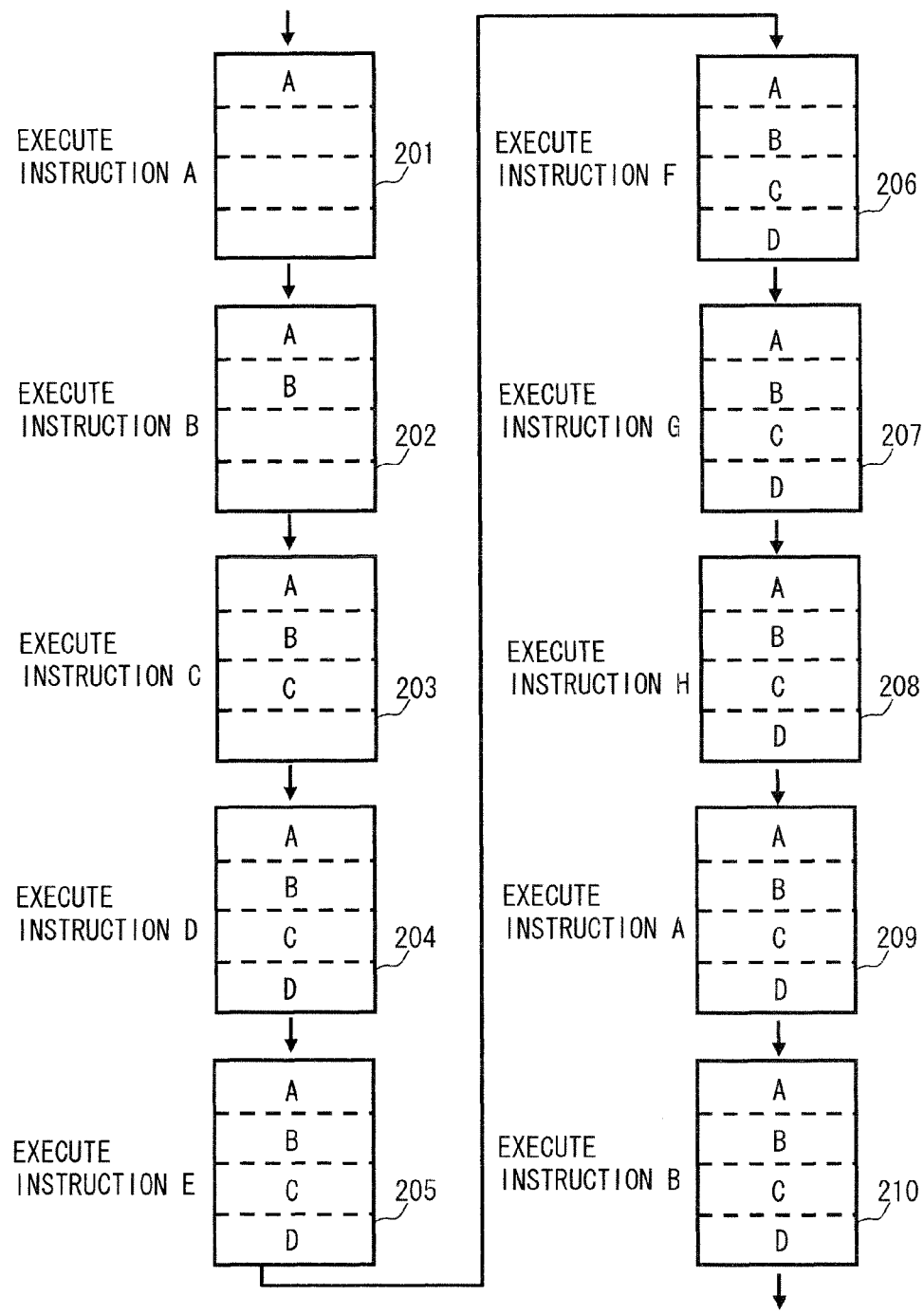
FIG. 11 explains the technique disclosed in Japanese Unexamined Patent Application Publication No. 9-305490.

Next, an operation of the microprocessor system 4 including the cache memory apparatus according to this embodiment is explained. FIG. 8 is a flowchart for explaining the operation of the cache memory apparatus shown in FIG. 7. The operation of the microprocessor system 4 including the cache memory apparatus according to this embodiment is same as the operation of the microprocessor system 1 according to the first embodiment shown in FIG. 2 except for the point that the instruction code is temporarily stored to the buffer 45 (step S3') and the point that the instruction code is transferred to the cache memory 42 from the buffer 45 (step S10).

First, the CPU 10 starts outputting the fetch address 51 to the memory 11 in order to read the instruction code from the memory 11 (step S1). The branch detection circuit 16 monitors the fetch address 51 output from the CPU 10 and when the fetch address 51 indicates the branch into the subroutine (step S2: Yes), outputs the branch notification signal 55 to the update control circuit 17. For example, the branch detection circuit 16 evaluates that the program has branched into the subroutine when the fetch address 51 output from the CPU 10 changes from a continuous address to a discontinuous address. Note that when the fetch address 51 does not indicate the branch into the subroutine (step S2: No), the branch detection circuit 16 continues to monitor the fetch address 51 output from the CPU 10.

When the branch notification signal 55 is supplied from the branch detection circuit 16, the update control circuit 17 outputs the cache start notification signal 57 to the buffer 45. Then, the buffer 45 starts storing the instruction code 52.

On the other hand, when the fetch address 51 is supplied, the memory 11 outputs the instruction code 52 corresponding to this fetch address 51 to the prefetch buffer 14 in the CPU 10 and the buffer 45. Further, the memory 11 outputs to the prefetch buffer 14 in the CPU 10, the buffer 45, and the update control circuit 17 the instruction code storage enable signal 53 indicating that the effective instruction code 52 is output from the memory 11. Note that the operation example shown in FIG. 8 indicates the case in which the instruction code corresponding to the fetch address 51 is not cached in the cache memory 42 (i.e., when there is no cache hit).

When the instruction code 52 and the instruction code storage enable signal 53 are supplied from the memory 11, the prefetch buffer 14 in the CPU 10 stores this instruction code 52 to the prefetch buffer 14.

Additionally, when the instruction code 52 and the instruction code storage enable signal 53 are supplied from the memory 11, the buffer 45 stores this instruction code 52 to the buffer 45 (step S3'). At this time, the buffer 45 updates the logical value of the effective flag bit 48 corresponding to the memory cell to which the instruction code 52 is stored to "1" (step S4). That is, the instruction code 52 stored to the buffer 45 is enabled.

For example, the effective flag bit 48 is set to "1" when the effective instruction code is stored to the memory cell and set to "0" when the effective instruction code is not stored. Then, when the instruction code in the next subroutine is stored, the instruction code is stored to the memory cell where the effective flag bit 48 is "0".

Moreover, when the instruction code storage enable signal 53 is supplied from the memory 11, the counter 18 of the update control circuit 17 increments the counter value (step S5). Then, the update control circuit 17 compares the maximum number of the instruction codes set by the maximum instruction number signal 56 with the value of the counter 18 (that corresponds to the number of the instruction codes stored to the buffer 45) and evaluates whether or not the value of the counter 18 exceeds the maximum number of the instruction codes (step S6).

When the value of the counter 18 does not exceed the maximum number of the instruction codes (i.e., the value of the counter 18 is less than or equal to the maximum number of the instruction codes, step S6: No), the effective flag bit 48 of the stored instruction code remains effective ("1"). Next, the branch detection circuit 16 monitors the next fetch address 51 output from the CPU 10, and when the fetch address 51 does not indicate the branch into a new subroutine (step S7: No), the operation after the step S2 is repeated. On the other hand, when the next fetch address 51 output from the CPU 10 indicates the branch into a new subroutine (step S7: Yes), the value of the counter 18 is reset (step S8). Then, the buffer 45 transfers the temporarily stored instruction code (the cache target instruction code 82) to the cache memory 42 (step S10). At this time, the transfer enable signal 81 is activated. After that, the operation after the step S2 is repeated.

Moreover, when the value of the counter 18 exceeds the maximum number of the instruction codes (step S6: Yes), the effective flag bits of all the instruction codes in the subroutine including the last cached instruction code are disabled ("0") (step S9). Specifically, when the value of the counter 18 exceeds the maximum number of the instruction codes set by the maximum instruction number signal 56 (step S6: Yes), the update control circuit 17 outputs the effective flag bit reset signal 59 to the buffer 45 and disables ("0") the effective flag bits 48 of all the instruction codes in the subroutine including the last cached instruction code. Further, the update control circuit 17 outputs the cache stop notification signal 58 to the buffer 45 for the buffer 45 to stop storing the instruction code 52. After that, the operation after the step S1 is repeated.

As described above, the microprocessor system 4 according to this embodiment includes the buffer 45 capable of temporarily storing the instruction code and the effective flag bit 48 is provided to this buffer 45. Then, when the number of the instruction codes stored to the buffer 45 is less than or equal to the previously set maximum number, the instruction code temporarily stored to the buffer 45 is transferred to the cache memory 42. Accordingly, it is not necessary to provide the effective flag bit in the cache memory 42, thereby simplifying the configuration of the cache memory.

The first to fourth embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A cache memory apparatus comprising;
   a cache memory that caches an instruction code corresponding to a fetch address; and
   a cache control circuit that controls the instruction code to be cached in the cache memory, wherein the cache control circuit:
      caches the instruction code corresponding to a subroutine when the fetch address indicates a branch into the subroutine, and
      disables the instruction code to be cached when a number of instruction codes to be cached exceeds a previously set maximum number; and
   wherein the previously set maximum number of the instruction codes is obtained by dividing a number of clocks since a CPU outputs the fetch address to a memory until the memory outputs the instruction code by a number of clocks necessary for the CPU to execute one instruction code.

2. The cache memory apparatus according to claim 1, wherein
   the cache control circuit
      caches the instruction code corresponding to the subroutine in the cache memory when the fetch address indicates the branch into the subroutine, and
      disables the cached instruction code when the number of the cached instruction codes exceeds the previously set maximum number.

3. The cache memory apparatus according to claim 2, wherein:
   the cache memory is provided for a memory cell, the memory cell storing the instruction code,
   the cache memory holds an effective flag indicating whether or not each of the cached instruction codes is effective,
   the effective flag is enabled when the instruction code corresponding to the subroutine is cached in the cache memory, and
   the effective flag of the cached instruction code is disabled when the number of the cached instruction codes exceeds the previously set maximum number.

4. The cache memory apparatus according to claim 3, wherein the instruction code is cached in a memory cell with the effective flag being disabled when the instruction code is cached in the cache memory.

5. The cache memory apparatus according to claim 1, wherein
the cache control circuit comprises a buffer that is capable of temporarily holding the instruction code corresponding to the fetch address, and
the cache control circuit
holds the instruction code corresponding to the subroutine in the buffer when the fetch address indicates the branch into the subroutine,
transfers the instruction code held in the buffer to the cache memory when the number of the cached instruction codes is less than or equal to the previously set maximum number, and
disables the instruction code held in the buffer when the number of the cached instruction codes exceeds the previously set maximum number.

6. The cache memory apparatus according to claim 5, wherein
the buffer is provided for each memory cell that stores the instruction code and holds the effective flag indicating whether or not each of the stored instruction codes is effective,
the effective flag is enabled when the instruction code corresponding to the subroutine is held in the buffer, and
the effective flag of the held instruction code is disabled when the number of the held instruction codes exceeds the previously set maximum number.

7. The cache memory apparatus according to claim 6, wherein the instruction code is held in the memory cell with the effective flag being disabled when the instruction code is held in the buffer.

8. The cache memory apparatus according to claim 1, wherein
the cache control circuit comprises an update control circuit that instructs the cache memory to start and stop caching, and
the update control circuit
comprises a counter that counts the number of instructions in the subroutine stored to the cache memory, and
compares the previously set maximum number of the instruction codes with a value of the counter and disables the instruction code to be cached when the value of the counter exceeds the previously set maximum number of the instruction codes.

9. The cache memory apparatus according to claim 1, wherein the cache control circuit comprises a branch detection circuit that detects the fetch address has branched into the subroutine.

10. The cache memory apparatus according to claim 1, wherein the cache control circuit evaluates that the fetch address has branched into the subroutine according to a branch notification signal output from the CPU indicating that the fetch address has branched into the subroutine.

11. The cache memory apparatus according to claim 1, wherein:
the cache control circuit comprises a maximum instruction number setting circuit that sets the maximum number of the instruction codes, and
the maximum instruction number setting circuit sets the maximum number of the instruction codes according to clock number information regarding the number of clocks necessary for the CPU to execute one instruction code and latency information regarding the number of the clocks since the CPU outputs the fetch address to a memory until the memory outputs the instruction code.

12. A microprocessor system comprising:
a CPU;
a memory that stores an instruction code to be executed in the CPU;
a cache memory that caches the instruction code corresponding to a fetch address output from the CPU; and
a cache control circuit that controls the instruction code to be cached in the cache memory, wherein the cache control circuit:
caches the instruction code corresponding to the subroutine when the fetch address indicates a branch into a subroutine, and
disables the instruction code to be cached when a number of the instruction codes to be cached exceeds a previously set maximum number; and
wherein the previously set maximum number of the instruction codes is obtained by dividing a number of clocks since a CPU outputs the fetch address to a memory until the memory outputs the instruction code by a number of clocks necessary for the CPU to execute one instruction code.

13. A cache control method for a cache memory that caches an instruction code corresponding to a fetch address, the cache control method comprising:
caching the instruction code corresponding to a subroutine when the fetch address indicates a branch into the subroutine; and
disabling the instruction code to be cached when a number of the instruction codes to be cached exceeds a previously set maximum number, and
wherein the previously set maximum number of the instruction codes is obtained by dividing a number of clocks since a CPU outputs the fetch address to a memory until the memory outputs the instruction code by a number of clocks necessary for the CPU to execute one instruction code.

* * * * *